United States Patent
Park et al.

(10) Patent No.: US 9,255,224 B2
(45) Date of Patent: Feb. 9, 2016

(54) METHOD FOR INCREASING AMOUNT OF COKE OVEN GAS BY USING CARBON DIOXIDE

(75) Inventors: Joo-Hyoung Park, Kyungsangbook-do (KR); Hee-Dong Chun, Kyungsangbook-do (KR); Je-Young Kim, Kyungsangbook-do (KR); Heung-Soo Park, Kyungsangbook-do (KR); Min-Young Yi, Kyungsangbook-do (KR); Kun-Woo Han, Kyungsangbook-do (KR); Chang-Houn Rhee, Kyungsangbook-do (KR); Sung-Uk Ryu, Kyungsangbook-do (KR)

(73) Assignee: Research Institute of Industrial Science & Technology, Pohang, Kyungsangbook-Do (KR)

( * ) Notice: Subject to any disclaimer, the term of this patent is extended or adjusted under 35 U.S.C. 154(b) by 841 days.

(21) Appl. No.: 13/520,046

(22) PCT Filed: Dec. 29, 2010

(86) PCT No.: PCT/KR2010/009480
§ 371 (c)(1),
(2), (4) Date: Aug. 9, 2012

(87) PCT Pub. No.: WO2011/081432
PCT Pub. Date: Jul. 7, 2011

(65) Prior Publication Data
US 2012/0305381 A1  Dec. 6, 2012

(30) Foreign Application Priority Data
Dec. 29, 2009  (KR) .................. 10-2009-0132722

(51) Int. Cl.
*C10B 57/18*  (2006.01)
*C10B 21/10*  (2006.01)
(Continued)

(52) U.S. Cl.
CPC . *C10B 57/18* (2013.01); *C10B 5/00* (2013.01); *C10B 21/10* (2013.01); *C10B 49/02* (2013.01); *C10B 57/12* (2013.01)

(58) Field of Classification Search
CPC .......... C10B 5/00; C10B 21/10; C10B 49/02; C10B 57/18; C10B 57/12
USPC .............................................. 201/36, 37, 40
See application file for complete search history.

(56) References Cited

U.S. PATENT DOCUMENTS 3,661,719 A * 5/1972 Kelmar ........................ 201/17
3,909,446 A   9/1975 Miyashita et al.
(Continued)

FOREIGN PATENT DOCUMENTS

CN  1092457 A  9/1994
CN  1417302 A  5/2003
(Continued)

OTHER PUBLICATIONS

Translation of JP 03-212487 (A), completed Sep. 3, 2015.*
(Continued)

*Primary Examiner* — Renee E Robinson
*Assistant Examiner* — Jonathan Miller
(74) *Attorney, Agent, or Firm* — Locke Lord LLP; Christopher J. Capelli; Judy Naamat

(57) ABSTRACT

Provided is a method of amplification of coke oven gas (COG) through reacting high-temperature carbon with carbon dioxide and/or water using waste heat generated in a coke oven. More particularly, a method of amplification of COG including providing a gasification agent including carbon dioxide, water, or a mixture thereof to a COG stream in a carburization chamber of a coke oven and gasifying carbon by allowing the gasification agent to react with carbon in the carburization chamber, and a coke oven apparatus suitable for the method are provided.

5 Claims, 1 Drawing Sheet

(51) Int. Cl.
*C10B 49/02* (2006.01)
*C10B 57/12* (2006.01)
*C10B 5/00* (2006.01)

(56) References Cited

U.S. PATENT DOCUMENTS

| | | | | |
|---|---|---|---|---|
| 3,912,502 | A | * 10/1975 | Miyashita et al. | 75/464 |
| 4,176,011 | A | * 11/1979 | Knappstein | 201/40 |
| 4,288,293 | A | * 9/1981 | Saller | 201/6 |
| 4,422,858 | A | * 12/1983 | Weber et al. | 48/197 R |
| 8,647,476 | B2 | * 2/2014 | Kim et al. | 201/36 |
| 2010/0025217 | A1 | * 2/2010 | Schuecker et al. | 201/15 |
| 2011/0088321 | A1 | 4/2011 | Kim | |

FOREIGN PATENT DOCUMENTS

| | | |
|---|---|---|
| CN | 101289620 A | 10/2008 |
| CN | 201258312 Y | 6/2009 |
| DE | 610232 C | 3/1935 |
| DE | 612009 C | 4/1935 |
| DE | 654262 C | 12/1937 |
| DE | 660530 C | 5/1938 |
| DE | 661172 C | 6/1938 |
| GB | 338153 A | 11/1930 |
| GB | 399859 A | 10/1933 |
| GB | 570301 A | 7/1945 |
| JP | 59-025882 | 2/1984 |
| JP | 60123592 A | 7/1985 |
| JP | 03-212487 | 9/1991 |
| JP | 09-104869 | 4/1997 |
| JP | 10-152686 | 6/1998 |
| JP | 10-287879 | 10/1998 |
| JP | 2002069456 A | 3/2002 |
| JP | 2003-082355 A | 3/2003 |
| KR | 10-0887137 | 3/2009 |
| KR | 10-2010-0076137 | 7/2010 |

OTHER PUBLICATIONS

Office Action dated Jan. 28, 2014 in connection with Japanese Application No. 2012-547022.

* cited by examiner

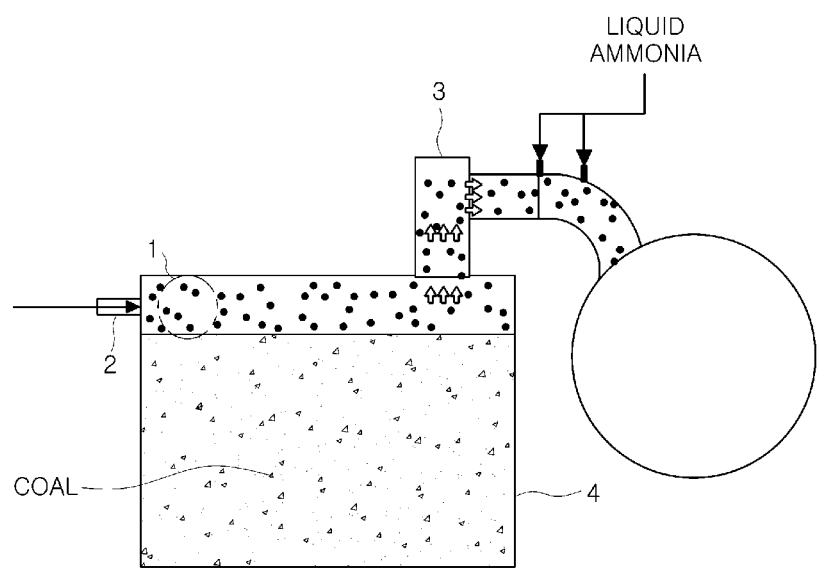

METHOD FOR INCREASING AMOUNT OF COKE OVEN GAS BY USING CARBON DIOXIDE

CROSS-REFERENCES TO RELATED APPLICATIONS

This application is a 35 U.S.C. §371 U.S. national entry of International Application PCT/KR2010/009480 (WO 2011/081432) having an International filing date of Dec. 29, 2010, which claims under 35 U.S.C. §119(a) the benefit of Korean Application No. 10-2009-0132722, filed Dec. 29, 2009, the entire contents of which are incorporated herein by reference.

TECHNICAL FIELD

The present invention relates to a method of amplification of coke oven gas (COG) by allowing high-temperature carbon to react with carbon dioxide and/or water by using waste heat generated in a coke oven.

BACKGROUND ART

Coke oven gas (COG) is a byproduct gas generated during a coke dry distillation process carried out in iron and steel making industry. COG is mostly used as a fuel in steel plants through a purification process, and amplification of COG has emerged as an important issue, as the amount of COG used in the iron and steel making industry has recently increased.

Meanwhile, the mass production of hydrogen has emerged as an important issue due to the recent carbon dioxide problem, in which COG has received attention as a potential fuel from which hydrogen can be mass-produced.

However, it may be difficult to recover energy from high-temperature crude COG through a heat exchanger, due to an existence of tar or hydrogen sulfide (H2S) included in the crude COG. In order to address such limitations, research on the decomposition of tar in high-temperature crude COG by using a catalyst or on the amplification of a combustible gas component by introducing oxygen and allowing partial oxidation to occur at a high temperature of about 1200° C. has recently been conducted in Japan. However, there may be issues of technical and economical limitations caused by catalyst regeneration and high oxygen consumption in such methods.

Research on obtaining carbon monoxide and hydrogen through reactions between carbon and carbon dioxide or water has received attention as a major potential method of coal gasification. However, high-temperature heat energy should be required for gasification and a large amount of oxygen should be used to implement this requirement.

DISCLOSURE

Technical Problem

As described above, high-temperature heat is required for reacting carbon with carbon dioxide or water. An aspect of the present invention provides a method of minimizing a high-temperature heat energy input by using waste heat of coke oven gas (COG) and high-temperature carbons, e.g., coke powder, coal powder, deposited carbon or sponge carbon, generated during the coke manufacturing.

Another aspect of the present invention provides a method of amplification of COG by converting low-utilized high-temperature carbon, particularly sponge carbon, generated during the coke manufacturing into carbon monoxide or carbon monoxide and hydrogen through a chemical reaction with carbon dioxide and water.

Another aspect of the present invention provides a method of increasing a total calorific value of COG by using the sensible heat of high-temperature crude COG generated from a coke oven.

Technical Solution

According to an aspect of the present invention, there is provided a method of amplification of coke oven gas (COG) including: providing a gasification agent including carbon dioxide, water, or a mixture thereof to a coke oven gas stream in a carburization chamber of a coke oven; and gasifying carbon by allowing the gasification agent to react with carbon in the carburization chamber.

The gasification agent may be provided to an upper COG stream in the carburization chamber of the coke oven.

An amount of the gasification agent provided to the COG stream may be in a range of 0.1% to 10% of a total amount of COG generated.

The COG stream having the gasification agent provided therein may be controlled to remain in the carburization chamber for 5 seconds to 1 minute.

According to another aspect of the present invention, there is provided a coke oven including a carburization chamber and an ascending pipe and having a coke oven gas stream moving from the carburization chamber to the ascending pipe formed therein, wherein the coke oven may include an inlet pipe providing a gasification agent including carbon dioxide, water, or a mixture thereof to the coke oven gas stream of the carburization chamber.

The inlet pipe may be formed to provide a gasification agent to an upstream side of an upper coke oven.

Advantageous Effects

An increase in an amount of COG may be possible according to an embodiment of the present invention, and CO2 may be used as a resource using waste heat and thus, a process of a reduction of a large amount of CO2 may be economically undertaken.

Also, the increased amount of COG may be used as a reducing agent and a heat source required in a steel making process or may be converted to hydrogen such that hydrogen may be mass-produced.

DESCRIPTION OF DRAWINGS

The above and other aspects, features and other advantages of the present invention will be more clearly understood from the following detailed description taken in conjunction with the accompanying drawings, in which:

FIG. 1 illustrates an example of an amplification process of coke oven gas by using carbon dioxide and water according to an embodiment of the present invention.

BEST MODE

Hereinafter, the present invention will be described in more detail with reference to the accompanying drawings. FIG. 1 illustrates an example of a process of amplification of coke oven gas (COG) by using carbon dioxide and water according to an embodiment of the present invention, wherein reference Nos mean as follows : 1: HIGH-TEMPERATURE CARBON, 2: GASIFICATION AGENT INLET PIPE, 3: ASCENDING PIPE, 4: CARBURIZATION CHAMBER.

As shown in FIG. 1, a gasification agent is introduced into a carburization chamber of a coke oven. Coke oven gas is generated as a byproduct during a coke dry distillation process at a relatively high temperature (about 1200° C.) after coal is charged in the carburization chamber for coke manufacturing. In addition to the coke oven gas, high-temperature carbons, such as coke powder, coal powder, deposited carbon, and sponge carbon, may exist in the carburization chamber. The generated coke oven gas generally has temperatures ranging from 800° C. to 1200° C.

Carbon dioxide and/or water are added to the crude COG to carry out a gasification reaction in an atmospheric pressure and thus, an amount of coke oven gas may be increased. At this time, a usable gasification agent may include carbon dioxide and water.

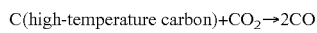

$\Delta H = 41.4$ kcal/mol(endothermic reaction: Boudouard reaction)

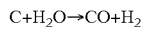

$\Delta H = 31.3$ kcal/mol(endothermic reaction: water-gas reaction)

In the present invention, carbon dioxide acts as a reactant for making carbon monoxide by generating an endothermic Boudouard reaction with high-temperature carbon in the coke oven with high-temperature waste heat of more than 800° C. Since the Boudouard reaction is further accelerated at a high temperature of 800° C. or more, the gasification agent may be provided to the carburization chamber maintained at a high temperature of 800° C. or more. For example, the gasification agent may be provided to a sidewall of the carburization chamber farthest from an ascending pipe, i.e., an upstream side of the coke oven, because a sufficient reaction time may be secured for the gasification reaction.

In contrast, a temperature of the ascending pipe is about 800° C., but the foregoing gasification reaction is not facilitated because a cooling zone using liquid ammonia is positioned near the ascending pipe. Thus, a relatively long retention time is required in this case. As a result, generating carbon monoxide through the gasification reaction is not facilitated due to limitations in the amount of carbon deposited, its temperature, and retention time as approaching nearer to the ascending pipe.

Therefore, as described above, a gasification agent inlet pipe supplying the gasification agent is installed on the sidewall of the carburization chamber, and the gasification agent inlet pipe may be installed at an upstream side of the carburization chamber of the coke oven.

Further, since the gasification reaction is a highly endothermic reaction, high-temperature waste heat of coke oven gas may not only be more effectively recovered, but also the amount of coke oven gas may be increased and carbon dioxide emissions may be reduced through the carbon dioxide utilization.

Water may be further added as a gasification agent. In this case, an endothermic water-gas reaction may be performed and thus, high-temperature waste heat may also be effectively recovered and carbon monoxide and hydrogen may be produced. As a result, the amount of coke oven gas may be increased and furthermore, hydrogen may be produced.

The gasification agent may be provided in a range of 0.1 vol % to 10 vol % of a total amount of coke oven gas generated, and, for example, may be 1 vol % to 5 vol %. For example, the gasification agent may be provided in a range of 1.5 vol % to 3 vol %. In general, an amount of coke oven gas generated is in a range of about 100 Nm³ to about 500 Nm³ for 1 ton of charged coal. When the amount of the gasification agent supplied is less than 0.1 vol % of the amount of coke oven gas generated, an effect due to the input of the gasification agent may be small, and when the amount of the gasification agent supplied is greater than 10 vol %, the amount of gasification agent not having being converted to carbon monoxide may be increased.

Also, a retention time of the gasification agent in the carburization chamber is required to be 5 seconds or more in order to sufficiently generate carbon monoxide and/or hydrogen gas by the gasification reaction with carbon. However, since an additional gasification reaction may not be performed when the retention time is greater than 1 minute, the retention time may be controlled to be within 1 minute. For example, the retention time may be controlled to be within a range of 10 seconds to 30 seconds. The control of the retention time may be performed by controlling flows of the gasification agent and the stream or adjusting a length of the carburization chamber.

Further, a coke oven with an inlet pipe of gasification agent to inject carbon dioxide, water, or a mixture thereof and with a carburization chamber configured to secure a reaction retention time may increase the amount of COG. Also, the coke oven may include a post-process system to treat the increased amount of COG, and the post-treatment process system may include a facility which separates and stores carbon monoxide and hydrogen generated in a reaction between high-temperature carbon and added gasification agent including carbon dioxide and water.

[Mode for Invention]

EMBODIMENT

Example 1

Carbon dioxide ($CO_2$) at a level of 2% of an amount of generated COG was added to COG gas (nitrogen gas as a remainder) composed of 27 vol % of methane, 56% of hydrogen, 8% of carbon monoxide, and 3% of carbon dioxide at a reaction temperature of 1000° C. by using a coke oven simulation system. At this time, the addition of $CO_2$ was performed at a side of a carburization chamber farthest from an ascending pipe. At this time, the reaction was performed to maintain a retention time for 20 seconds in the carburization chamber at 1000° C.

In a composition of gas generated after the addition of $CO_2$, hydrogen was decreased to an amount of 54 vol % and carbon monoxide was increased to an amount of 12 vol %. According to the foregoing result, it may be confirmed that most of the added $CO_2$ was converted to carbon monoxide (CO) through a Boudouard reaction.

Comparative Example 1

Experimentation was performed in the same manner as Example 1, except that a retention time of carbon dioxide provided by being added at a position near the ascending pipe in the carburization chamber was controlled to be 2 seconds.

A composition of gas generated after the addition of $CO_2$ was virtually unchanged and it may be confirmed that about 10% of the added carbon dioxide was converted to CO.

An increase in an amount of COG may be possible according to an embodiment of the present invention, and CO2 may be used as a resource using waste heat and thus, a process of a reduction of a large amount of CO2 may be economically undertaken.

Also, the increased amount of COG may be used as a reducing agent and a heat source required in a steel making process or may be converted to hydrogen such that hydrogen may be mass-produced.

While the present invention has been shown and described in connection with the exemplary embodiments, it will be apparent to those skilled in the art that modifications and variations can be made without departing from the spirit and scope of the invention as defined by the appended claims.

The invention claimed is:

1. A method of amplification of coke oven gas (COG), the method comprising:
   coking coal in a coke oven to create a COG stream and coke;
   providing a gasification agent including at least one of carbon dioxide and water to the COG stream in a carburization chamber of the coke oven; and
   gasifying carbon by allowing the gasification agent to react with carbon in the carburization chamber,
   wherein an amount of the gasification agent provided to the COG stream is in a range of 0.1% to 10% of a total amount of COG generated, and the COG stream having the gasification agent provided therein is controlled to remain in the carburization chamber for 5 seconds to 1 minute.

2. The method of claim 1, wherein the gasification agent is provided to an upper COG stream in the carburization chamber of the coke oven.

3. The method of claim 1, wherein the COG generated is suitable for use as a fuel for a steel plant.

4. The method of claim 1, wherein the carbon is at least one of coke powder and coal powder that is dispersed in contents of the carburization chamber.

5. The method of claim 1, wherein nitrogen content of the COG stream is about 6%.

* * * * *